United States Patent Office

3,780,111
Patented Dec. 18, 1973

3,780,111
REDUCTION OF TRIPHENYLPHOSPHINE OXIDE WITH IRON TO TRIPHENYLPHOSPHINE
David A. Young and Kent C. Brannock, Kingsport, Tenn.; said Young assignor of a fractional part interest to Eastman Kodak Company
No Drawing. Filed July 28, 1972, Ser. No. 276,270
Int. Cl. C07f 9/50
U.S. Cl. 260—606.5 P          5 Claims

ABSTRACT OF THE DISCLOSURE

A process for reducing trihydrocarbon phosphorus oxide to trihydrocarbon phosphorus by reacting the trihydrocarbon phosphorus oxide with a halo-complexing agent forming an adduct of trihydrocarbon phosphorus dihalide with the agent. The adduct is heated to its decomposition temperature in a halobenzene solvent having a boiling point higher than the decomposition temperature of the adduct to separate the trihydrocarbon phosphorus dihalide from the complex. The dihydrocarbon phosphorus dihalide is then reduced with iron forming trihydrocarbon phosphorus.

---

This invention relates to a process for reducing trihydrocarbon phosphorus oxide to trihydrocarbon phosphorus and more particularly relates to the reduction of triphenylphosphorus oxide with iron to triphenylphosphine.

Triphenylphosphine is widely utilized in processes employing a Wittig reaction. For example, several synthesis of vitamins A and E utilize the Wittig reaction and in these reactions triphenylphosphine is oxidized to triphenylphosphine oxide. A factor in the economic utilization of the Wittig reaction is the ability to convert the triphenylphosphine oxide back to triphenylphosphine. In U.S. Pat. 3,405,180 there is disclosed a process for producing trihydrocarbon phosphorus oxide to trihydrocarbon phosphorus utilizing as a reducing agent metals having an oxidation potential ranging from 0.75 volt to 2.5 volts. Typical of such metals are zinc, manganese, aluminum, magnesium, with the preferred metal being aluminum. However, these metals suffer from one or more of the disadvantages of being expensive or hazardous to utilize or they produce relatively low yields in the reducing step.

Accordingly, it is an object of this invention to set forth a process for reducing trihydrocarbon phosphorus oxide to trihydrocarbon phosphorus utilizing an inexpensive, common, non-hazardous metal which results in good yield of product, namely, iron having an oxidation potential (Electromotive Series Table-Chart of W. H. Latimer, published 1956 by W. M. Welch Manufacturing Company) of 0.44 volt.

In accordance with the process of this invention trihydrocarbon phosphorus oxide is reacted with a halo-complexing agent thereby forming an adduct of trihydrocarbon phosphorus dihalide with the agent. The adduct is heated to its decomposition temperature of at least 105° C. in a halobenzene solvent having a melting point of less than about 55° C. and a boiling point higher than the decomposition temperature and less than about 250° C. to separate trihydrocarbon phosphorus dihalide from the complex. The trihydrocarbon phosphorus dihalide is reduced with iron having an oxidation potential of 0.44 volt thereby forming trihydrocarbon phosphorus.

The trihydrocarbon phosphorus oxide treated in accordance with this invention may be in a pure form but will more commonly be in a solvent recovered by as a by-product from a Wittig reaction. The trihydrocarbon phosphorus oxides utilized in the practice of the invention have the formula $R_3PO$ wherein R may be alkyl, cycloalkyl, aryl, alkaryl, and aralkyl groups. When R is an alkyl group it may include methyl, ethyl, n-propyl, i-propyl, n-butyl, i-butyl, t-butyl, n-amyl, n-hexyl, 2-ethylhexyl, n-octyl, and so forth. When R is a cycloalkyl group, it may include cyclohexyl, cycloheptyl, and so forth. When R is an aryl group it may include phenyl, naphthyl, and so forth. When R is an alkaryl group, it may include tolyl, xylyl, and so forth. When R is an aralkyl group, it may include benzyl, phenylethyl, phenylpropyl, t-chlorophenylpropyl, m-methoxyphenylethyl. All of the R groups need not be the same.

Generally speaking the material to be treated will be triphenylphosphine oxide as this material is widely utilized in the Wittig reaction.

The preferred halo-complexing agent is phosphorus pentachloride. Other halo-complex agents which can be employed include pentahalides of arsenic, antimony, and phosphorus as for example antimony pentabromide, antimony pentachloride, arsenic pentachloride, arsenic pentabromide, and arsenic pentafluoride. In addition thionylchloride and mixed agents including phosphorus dibromide trifluoride may also be employed.

It is preferred to carry out this process in the presence of a halobenzene solvent. This halobenzene solvent preferably has a melting point of less than about 55° C. and a boiling point of less than about 250° C. it is therefore in the liquid phase in the range of about 55° C. to 250° C. The preferred solvent is one which has a boiling point higher than the decomposition temperature of the adduct of triyhdrocarbon phosphorus with the halo-complexing agent and which is inert relative to the reactants or products employed or produced.

Examples of halobenzene solvents which can be employed include: a monohalobenzene such as monochlorobenzene or monobromobenzene; a dihalobenzene such as ortho-dichlorobenzene, ortho-dibromobenzene, meta-dichlorobenzene, meta-dibromobenzene, para-dichlorobenzene; a trihalobenzene such as 1,2,3-trichlorobenzene or 1,2,4-trichlorobenzene. Liquid mixtures of halobenzenes such as mixtures of isomers of dichlorobenzene or dibromobenzene or trichlorobenzene can be utilized. Further mixtures which can be employed include 1,2,3-trichlorobenzene and 1,3,5-trichlorobenzene, mixtures of ortho-dibromobenzene and para-dibromobenzene. Preferred halobenzene solvents are those including chlorine and the particular preferred solvent is ortho-dichlorobenzene.

The metal-reducing agent is in the form of iron filings or preferably electrolytic iron dust of 10 to 500 mesh and preferably 100 mesh.

In the practice of the process in accordance with this invention 1 to 50 parts of trihydrocarbon phosphorus oxide are dissolved in 1 to 500 parts of the halobenzene solvent under an inert gas such as argon. 1 to 50 parts of the solvent are distilled over a Vigreux column to remove water. The solution is cooled, 1 to 50 parts by weight of a halo-complexing agent are added and the mixture is heated to about 80 to 150° C. These reactants form trihydrocarbon phosphorus dihalide complexed with the complexing agent which moiety lacks the halide groups that have replaced the oxygen of the oxide. These complexes may be referred to as adducts.

This adduct is decomposed by heating it to its decomposition temperature for a period of about 30 to 300 minutes liberating phosphorus oxyhalide which is distilled over and is recovered. The residue from the distillation is trihydrocarbon phosphorus dihalide.

This trihydrocarbon phosphorus dihalide is cooled and about 1 to 50 parts by weight based on the weight of the trihydrocarbon phosphorus dihalide of iron filings or preferably electrolytic iron dust are added and the mixture heated at reflux with stirring for from about 30 to 300 minutes. The mixture is then cooled and 10 to 500 parts by weight water are added with stirring. This mixture is filtered free of excess iron as by passing it through a coarse glass frit. The organic layer is then stripped of the solvent which is distilled off at reduced pressure and the resulting product is dissolved in 1 to 500 parts by weight of a suitable solvent such as methanol and chilled to −80 to 10° C. forming a crystalline product. The crystalline product is filtered off by use of a coarse glass frit and dried resulting in a residue which is substantially pure trihydrocarbon phosphine.

The following example is presented for a more complete understanding of the invention.

EXAMPLE 55.6 grams (0.22 mole) triphenyl phosphine oxide is dissolved in 300 milliliters ortho-dichlorobenzene under argon. 20 milliliters of the solvent is distilled over a Vigreux column to remove water. The solution is cooled to 25° C. and 44.0 grams (0.210 mole) of phosphorus pentachloride is added forming an adduct which is heated to 140° C., the decomposition temperature of the adduct. This temperature is maintained for 90 minutes and the solvent and phosphorus oxychloride distill over and are recovered. The residue includes substantially pure triphenyl phosphorus dichloride. 22.5 grams (0.40 mole) of electrolytic iron dust (100 mesh) is added to the residue and the mixture heated at reflux with stirring for 120 minutes. After cooling, 200 milliliters of water is added with stirring and the mixture is filtered free of excess iron by passing it through a coarse glass frit. The orthodichlorobenzene is distilled off from the organic layer at reduced pressure and the resulting product is dissolved in 100 milliliters of methanol and chilled to −20° C. resulting in a crystalline product. The crystalline product is filtered off and dried giving 49.1 grams of triphenylphosphine. The yield is 93.5%.

Applicants have disclosed a process for producing trihydrocarbon phosphorus from trihydrocarbon phosphorus oxide. The process includes a reducing step in which iron having an oxidation potential of about 0.44 volt is used as a reducing agent. As compared to reducing agents previously utilized in such processes, iron is less expensive, is less hazardous to use, and results in a better yield.

Although the invention has been described in considerable detail with particular reference to certain preferred embodiments thereof, variations and modifications can be effected within the spirit and scope of the invention.

We claim:
1. Process for reducing trihydrocarbon phosphorus oxide to trihydrocarbon phosphorus which comprises reacting trihydrocarbon phosphorus oxide with a halo-complexing agent selected from the group consisting of thionyl chloride and pentahalides of arsenic, antimony, and phosphorus, thereby forming an adduct of trihydrocarbon phosphorus dihalide with said agent; heating said adduct to its decomposition temperature of at least 105° C. in a halobenzene solvent having a melting point of less than about 55° C. and a boiling point higher than said decomposition temperature and less than about 250° C. thereby separating trihydrocarbon phosphorus dihalide from said adduct; and reducing said trihydrocarbon phosphorus dihalide with iron having an oxidation potential of about 0.44 volt, thereby forming trihydrocarbon phosphorus.

2. Process according to claim 1 wherein said halobenzene is ortho-dichlorobenzene.

3. Process according to claim 1 wherein said trihydrocarbon phosphorus oxide is triphenyl phosphorus oxide.

4. Process according to claim 1 wherein said halo-complexing agent is phosphorus pentachloride.

5. Process for reducing triphenylphosphorus oxide to triphenylphosphine which comprises reacting triphenylphosphorus oxide with phosphorus pentachloride thereby forming the phosphorus oxychloride adduct of triphenylphosphorus dichloride: heating said adduct to 110° C. to 150° C. in orthodichlorobenzene solvent thereby separating triphenylphosphorus dichloride from said adduct; and reducing said triphenylphosphorus dichloride with iron having an oxidation potential of about 0.44 volt, thereby forming triphenylphosphine.

References Cited
UNITED STATES PATENTS

| | | | |
|---|---|---|---|
| 3,405,180 | 10/1968 | Natoli | 260—606.5 P |
| 3,280,195 | 10/1966 | Fritzsche et al. | 260—606.5 P |
| 3,261,871 | 7/1966 | Frizsche et al. | 260—606.5 P |
| 3,071,616 | 1/1963 | Groenweghe | 260—606.5 P X |

DANIEL E. WYMAN, Primary Examiner

P. F. SHAVER, Assistant Examiner